US005113311A

United States Patent [19]

[11] Patent Number: 5,113,311

Kamp et al.

[45] Date of Patent: May 12, 1992

[54] ELECTRICAL PANEL ASSEMBLY

[75] Inventors: David C. Kamp; William H. Hanks, both of Cincinnati, Ohio

[73] Assignee: Cooper Industries, Inc., Houston, Tex.

[21] Appl. No.: 452,845

[22] Filed: Dec. 18, 1989

[51] Int. Cl.$^{5}$ ........................ H02B 1/01; H01H 47/00; H01R 13/44

[52] U.S. Cl. .................................... 361/346; 439/137; 439/133; 361/192; 361/179; 361/339

[58] Field of Search ............... 361/337, 339, 346, 192, 361/191, 187; 439/136, 137, 138, 139, 140, 143, 145, 101, 103, 106, 299, 133

[56] References Cited

U.S. PATENT DOCUMENTS 4,767,347 8/1988 Kamp et al. ........................ 439/133
4,845,593 7/1989 Brown et al. ....................... 361/192

*Primary Examiner*—Leo P. Picard
*Assistant Examiner*—Bot Ledynh
*Attorney, Agent, or Firm*—Frost & Jacobs

[57] ABSTRACT

An improved electrical panel assembly of the type providing a plurality of receptacles for use with cable connectors and requiring that the connectors must be connected with their respective receptacles in a given order and disconnected therefrom in the reverse of that order. The panel assembly comprises a planar panel element having an opening therein for each receptacle and a receptacle mounting housing element behind each panel opening, constituting an integral, one-piece molding. Each panel opening is provided with a cover swingable between a closed position and an open position. The connectors and receptacles are of the known type having single contacts which lock together when the connector is mated with the receptacle and rotated a partial revolution. Polarizing devices are provided in association with each receptacle and each cable connector. Each panel opening, except the first, is provided with a locking mechanism of simplified construction which is shiftable between a normal locking position wherein it precludes opening of the cover of the next adjacent panel opening and a retracted position permitting opening of the cover of the next adjacent panel opening. The locking mechanism of each opening is shifted to its retracted position when the appropriate connector is inserted through the preceding opening and mated and locked with its receptacle. Each locking mechanism in retracted position precludes removal of the connector from the preceding opening. As a result of the simpler locking mechanism, the panel can be made smaller overall, with fewer parts and simpler assembly.

8 Claims, 11 Drawing Sheets

ELECTRICAL PANEL ASSEMBLY

TECHNICAL FIELD

The invention relates to an electrical panel assembly having a plurality of receptacles for use with cable connectors, together with polarizing means assuring that each connector is matable only with its respective receptacle and locking means determining the order in which the connectors are connected and disconnected assuring that ground makes first and breaks last, and more particularly to such an electrical panel assembly which is simple in construction and easy to assemble.

BACKGROUND ART

While the invention is not intended to be so limited, the panel assembly taught herein is particularly useful in lighting and sound applications for theatrical and concert productions, circuses, television studios, movie studios and the like. Lighting and sound equipment require a multitude of connections. In these applications, single conductor connectors are preferred. This is true because cable for multiple conductor connectors is generally of large diameter, heavy, and difficult to maneuver and transport.

When dealing with single conductor connectors, there are several important factors to consider, to prevent damage to the equipment and for safety reasons. First of all, it is important that each individual connector be connected only to its intended receptacle. While color coding and various types of indicia are helpful in this respect, they do not preclude error. It is therefore highly desirable that means be provided making it physically impossible to mate a connector with any receptacle other than its intended receptacle. Secondly, it is frequently important, both to protect the equipment and as a safety factor, to connect and disconnect a series of connectors to and from a panel in a particular order. For example, where a ground is used, it is generally desirable that the ground makes first and breaks last.

Prior art workers have devised electrical panel assemblies wherein means are provided to prevent mating of a contact with other than its intended receptacle and means requiring the connectors to be mated with their respective receptacles in a given order, and disconnected therefrom in the reverse order.

An exemplary electrical panel assembly of the type contemplated is taught in U.S. Pat. No. 4,767,347. The teachings of this patent are incorporated herein by reference.

Briefly, U.S. Pat. No. 4,767,347 describes an electrical panel assembly having a plurality of receptacles for use with single contact cable connectors. The connectors and receptacles are of the well-known type having single contacts which lock together when the connector is mated with the receptacle and rotated a partial revolution with respect thereto. The panel assembly comprises a front panel element having two or more receptacles mounted therebehind in side-by-side relationship. In an exemplary embodiment, the panel was described as having a ground receptacle, a neutral receptacle, and first, second and third current-carrying receptacles, arranged in that order. The front panel element has an opening therein for each receptacle through which a cable connector can be extended for mating with the receptacle. Polarizing devices are provided in association with each receptacle and in association with each cable connector, to assure that each cable connector can be mated only with its respective receptacle. Each front panel element opening, except for the first opening for the ground receptacle, is provided with a locking mechanism shiftable between a normal locking position wherein it precludes entrance of a connector into its respective front panel element opening and a retracted position, permitting entrance of a connector into its respective front panel element opening. The locking mechanism for each front panel element opening is shifted to its retracted position when the appropriate connector is inserted through the preceding front panel element opening and mated and locked with its receptacle. Each locking mechanism in retracted position precludes removal of the connector from the preceding front panel element opening. As a result, the ground, neutral, and first, second and third connectors must be connected to the panel assembly in that order, and can only be disconnected therefrom in the reverse order.

In the preferred embodiment of U.S. Pat. No. 4,767,347, the front panel element has a receptacle housing mounted to the rear surface thereof behind each of the front panel element openings. Each front panel element opening is provided with a cover, biased to the closed position. Each receptacle housing is provided with a locking pin which normally engages and locks the cover of the next succeeding front panel element opening in closed position. The receptacle housing contains a latch which normally locks the locking pin in its locking position. Each connector is provided with a polarizing shell and each housing is provided with a mating polarizing ring so that each connector can be connected only with its intended receptacle. When the first or ground connector is connected and locked with its respective receptacle, its polarizing ring shifts the latch to an inactive position releasing the locking pin so that the next front panel element cover can now be opened and its respective connector can now be mated with its appropriate receptacle. When each front panel element cover is released and opened in this way, it maintains its respective locking pin in unlocking position. This, in turn, prevents removal of the preceding connector from the panel assembly. Thus, the connectors must be connected to their respective receptacles in a given order and can be disconnected only in the reverse of that order.

The panel of the present invention constitutes an improvement upon the prior art panel just described. The electrical panel assembly of the present invention is simpler in construction, requiring fewer parts. As a result, it is easier and quicker to assemble, and cheaper to manufacture. The overall size of the electrical panel assembly may be made smaller and may be made to accommodate smaller connectors.

DISCLOSURE OF THE INVENTION

According to the invention there is provided an electrical panel assembly having a plurality of receptacles for use with single contact cable connectors. The connectors and the receptacles are of the well-known type having single contacts which lock together when a connector is mated with its respective receptacle and rotated a partial revolution with respect thereto.

The electrical panel assembly comprises a planar panel portion having an opening therethrough for each receptacle. The openings are arranged in side-by-side relationship, and behind each opening there is a housing element for each receptacle, again arranged in side-by-side relationship. The panel portion and the receptacle housing elements of the panel assembly comprise an integral, one-piece molded member. The left-hand most receptacle is considered the first receptacle, and the right-hand most receptacle is considered the last receptacle.

Each opening in the panel portion is provided with a hinged cover swingable between a closed position and an open position. Each receptacle housing portion, except the one for the last receptacle, is provided with a locking pin which is biased to a normal position wherein it engages and locks the cover of the next succeeding front panel element opening in closed position.

Each connector is provided with a polarizing shell and each housing element is provided with a mating polarizing ring rotatively mounted on its respective receptacle. As a result, each connector can be connected only with its respective receptacle. Each rotating ring is rotatable a partial turn between a normal position wherein its respective connector can be mated with its respective receptacle, and a position wherein its respective connector is locked to its respective receptacle. Each rotating ring carries a latch which is shiftable axially of its respective rotating ring between a normal locking position and a releasing position. The latch is spring biased to normal locking position. When in its normal locking position, it precludes rotation of its respective rotating ring and precludes shifting of its respective locking pin to its release position. When a contact is mated with its respective receptacle, the polarizing shell of the contact will shift the latch to its unlocking position, permitting its respective rotating ring to rotate so that the connector can be locked with respect to its receptacle and, at the same time, releasing its respective locking pin so that the next succeeding panel cover can be opened.

Thus, when the first or ground connector is connected and locked to its respective receptacle, its polarizing ring shifts the latch to its inactive position releasing the locking pin so that the next panel cover can be opened and its respective connector can now be mated with its appropriate receptacle. When each front panel element cover is released and opened in this way, it maintains its respective locking pin in its unlocking position. This, in turn, prevents removal of the preceding connector from the panel assembly. As a result, the connectors must be connected in their respective receptacles in a given order and can be disconnected only in the reverse of that order.

DETAILED DESCRIPTION OF THE INVENTION

Figure 1:
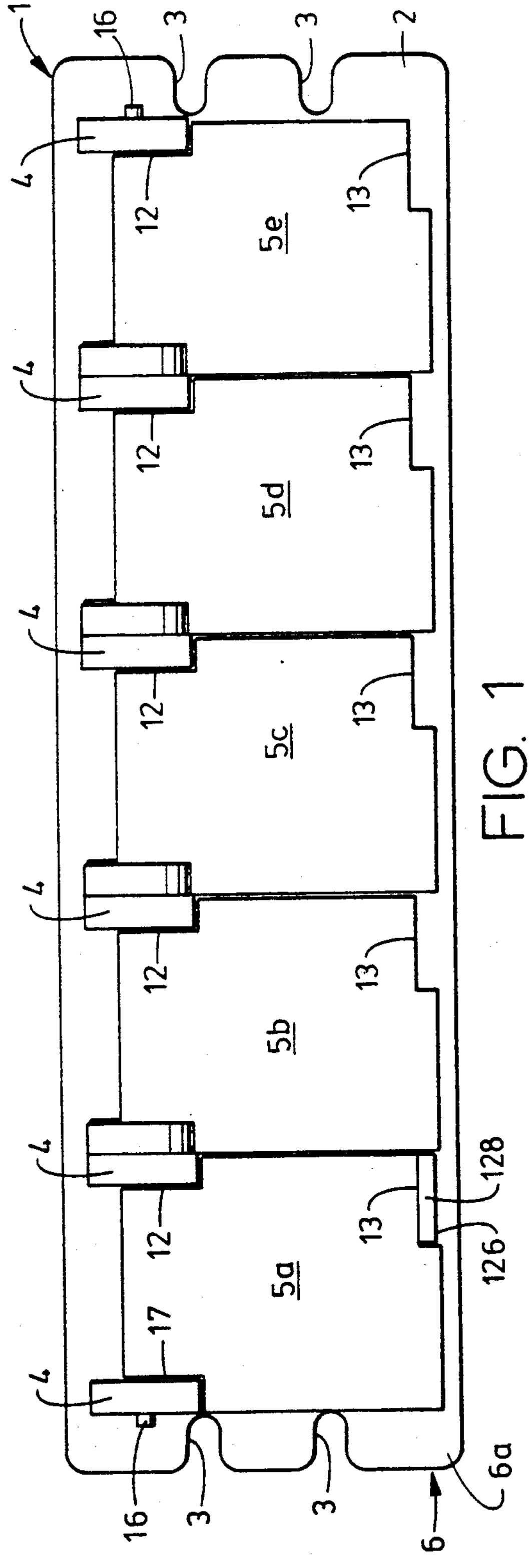
FIG. 1 is a front elevational view of the electrical panel assembly of the present invention.

Turning first to FIG. 1, this is a front elevational view of the complete electrical panel assembly of the present invention which is generally indicated by index numeral 1. The electrical panel assembly 1 has a planar front surface 2, which is rectangular in peripheral configuration and which is provided with slots 3 at its ends for the receipt of fastening means (not shown), by which it may be affixed to any desired structure, rack, console or surface. The planar surface 2 is provided with a plurality of forwardly extending lugs 4, serving as hinge means. The hinge means 4 support a plurality of covers 5a through 5e, the purpose of which will be apparent hereinafter.

Figure 2:
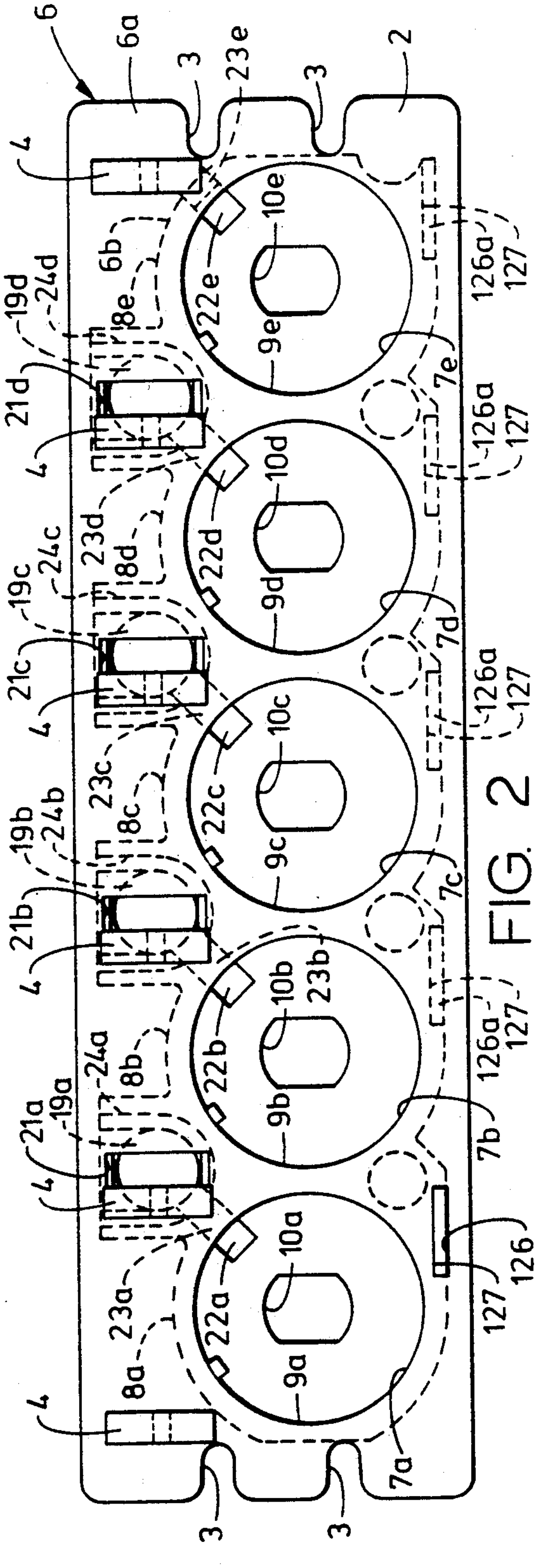
FIG. 2 is a front elevational view of the panel assembly molding of the present invention.
Figure 3:
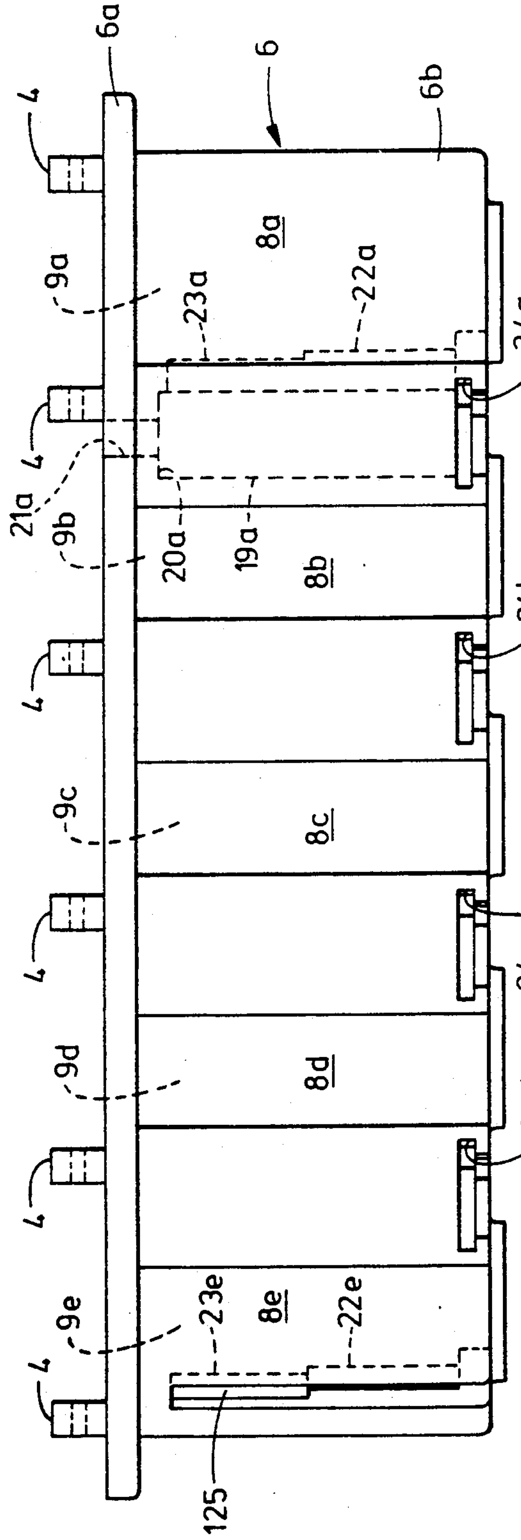
FIG. 3 is a plan view of the panel assembly molding.
Figure 4:
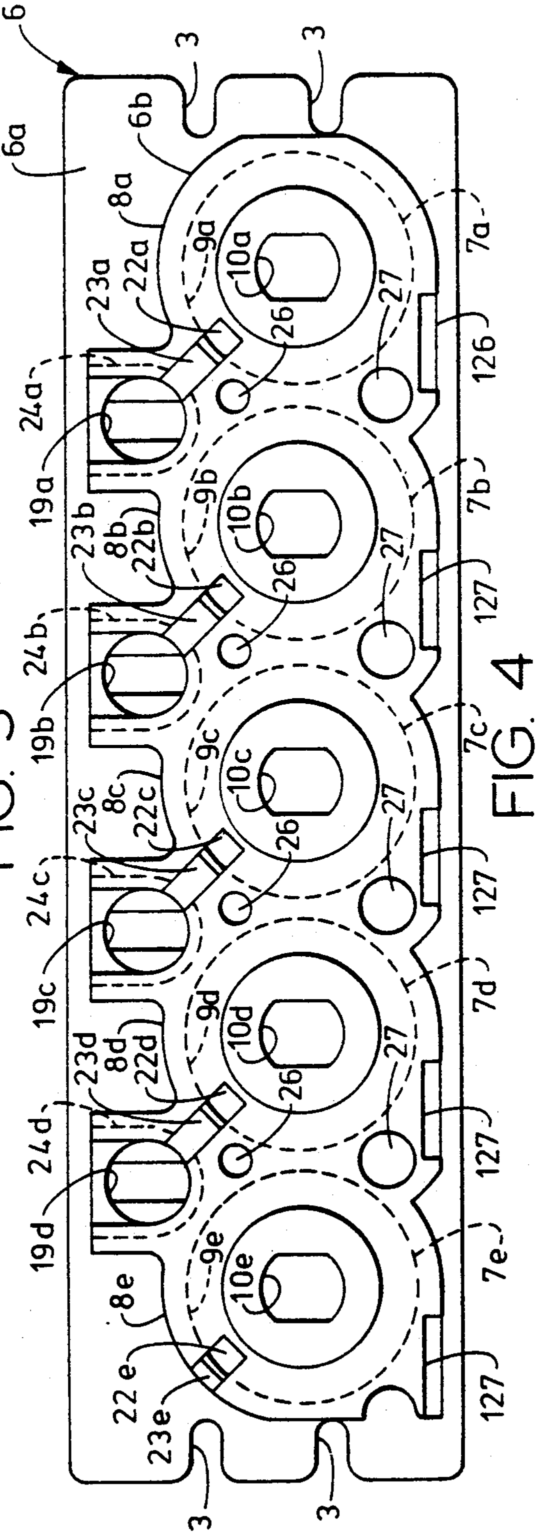
FIG. 4 is a rear elevational view of the panel assembly molding.

FIG. 2, 3 and 4 are, respectively, front, plan and rear views of the panel portion/housing portion molding (generally indicated at 6) of the electrical panel assembly of the present invention. The molding 6 is an integral, one-piece structure made of any appropriate insulative material such as thermoplastic resin. The molding 6 has a panel portion 6a and a housing portion 6b extending rearwardly thereof.

Turning first to FIG. 2, the panel portion 6a of molding 6 is provided with a plurality of openings 7a–7e. For purposes of this description, the left-hand most opening 7a will be considered the first opening and the right-hand most opening 7e will be considered the last opening. The openings 7a–7e are arranged side-by-side. As is most clearly shown in FIGS. 3 and 4, the housing portion 6b of molding 6 provides a housing element extending rearwardly behind each of the openings 7a–7e. These housing elements are indicated at 8a–8e. The housing elements 8a–8e are arranged side-by-side and constitute a part of the integral, one-piece molding 6.

Figure 7:
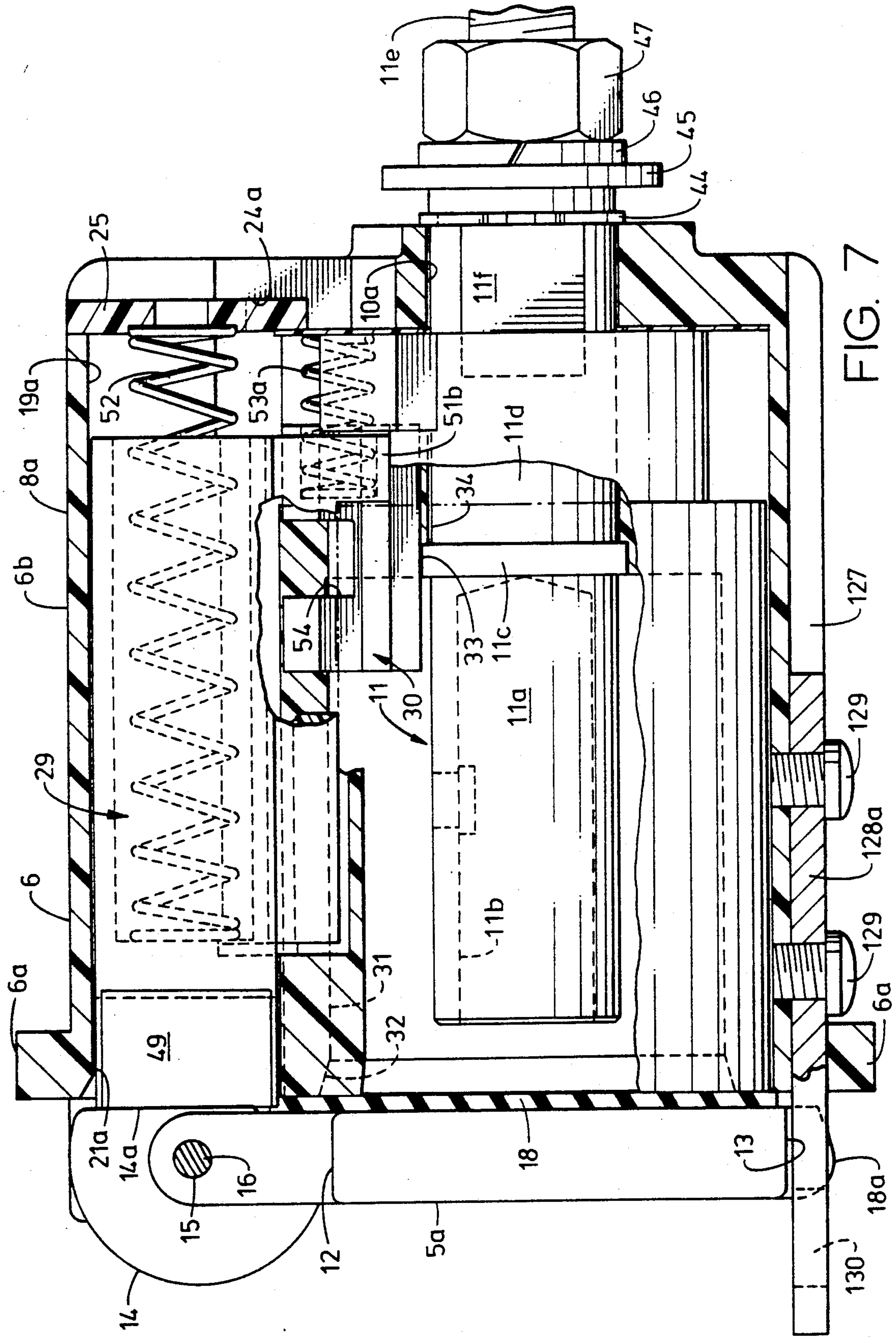
FIG. 7 is a cross-sectional view of the electrical panel assembly of the present invention illustrating a receptacle housing portion with all of its elements mounted therein, including a female receptacle.

Each of the housing elements 8a–8e provides a cylindrical chamber 9a–9e of substantially the same interior diameter as the panel openings 7a–7e. Each of the chambers 9a–9e terminates in a rear wall provided with a non-circular opening. The non-circular openings are illustrated in FIGS. 2 and 4 at 10a–10e. Each of the openings 10a–10e is intended to receive and retain a receptacle (not shown in FIGS. 2–4). In FIG. 7, housing element 8a is shown in cross-section with a receptacle 11 mounted therein, as will be more fully described hereinafter. From the above description, it will be apparent that there will be a panel opening 7a–7e, a housing element 8a–8e, a chamber 9a–9e and a non-circular opening 10a–10e for each receptacle of the panel. It will be equally apparent from the comparison of FIGS. 1 and 2 that each of the covers 5a–5e is intended to close its respective panel opening 7a–7e.

Figure 6:
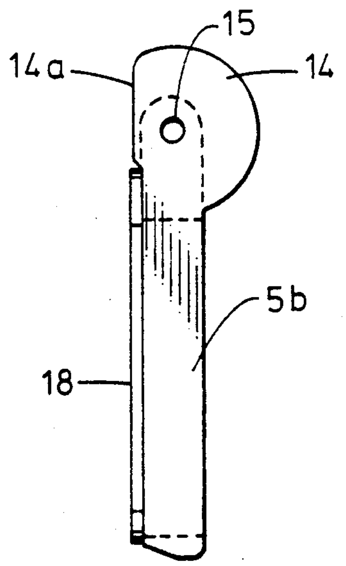
FIG. 6 is a side elevational view of the cover of FIG. 5 as viewed from the left of that Figure.
Figure 5:
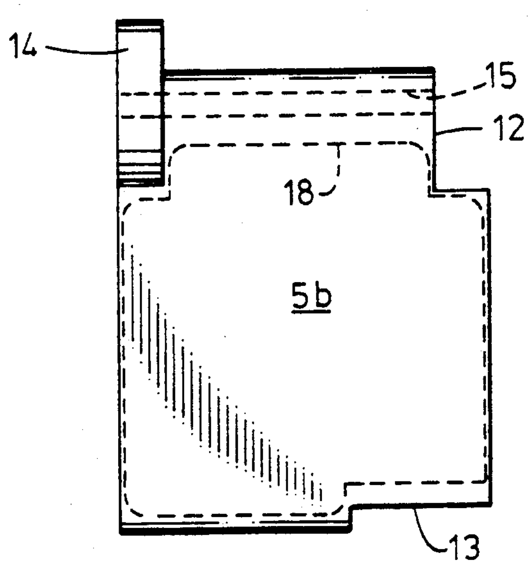
FIG. 5 is a front elevational view of a panel cover of the present invention.

Turning to FIGS. 5 and 6, an exemplary cover 5b is illustrated. The cover 5b is an essentially rectangular, planar structure, having a notch-like relief 12 at its upper right-hand corner and a notch-like relief 13 at its lower right-hand corner (as viewed in FIG. 5). The purpose of the notches 12 and 13 will be apparent hereinafter. At its upper left-hand corner (as viewed in FIG. 5) the cover 5 has an arcuate lug 14, provided with a planar rearward surface 14a (see FIG. 6). Finally, near its upper edge the cover 5 is provided with a transverse bore 15.

Returning to FIG. 1, it will be noted that the hinge elements 4 support a continuous hinge pin 16. The continuous hinge pin 16 passes through the bore 15 in cover 5b with sufficient clearance that the cover is swingable on hinge pin 16 between a closed position as shown in FIG. 1 and an open position.

As is apparent from FIG. 1, all of the covers 5b–5e are identical. The purpose of the cover notch 12 is to provide clearance for the hinge elements 4. Cover 5a differs from the remaining covers 5b–5e in that it is not provided with an arcuate lug 14, but rather a notch-like relief 17 (similar to the notch-relief 12) which provides clearance for the left-hand most hinge element 4 (as viewed in FIG. 1). The reason for this difference in cover 5a will be apparent hereinafter. Each of the covers 5a through 5e may be provided on their inside surface with a layer 18 of sealing material, such as PVC elastomer, to form a seal between each cover and the molding 6 when the covers are in their closed positions, to prevent dirt and other foreign material from entering the chambers 9a–9e. Each of the covers may be provided with an undercut 18a to the rear of its lower edge for engagement by a fingernail or appropriate tool to facilitate opening thereof.

Returning to FIGS. 2, 3 and 4, the molding 6 is provided with cylindrical bores 19a–19d. These cylindrical bores, as viewed in FIG. 2, are located above and to the right of each of cylindrical chambers 9a–9d. It will be noted that there is no such cylindrical bore in association with cylindrical chamber 9e. Cylindrical chamber 9e is the last of the cylindrical chambers and no cylindrical bore is needed in association therewith, as will be apparent hereinafter. As is perhaps most clearly shown in FIG. 3, cylindrical bore 19a extends through the rear wall of housing portion 6b, forwardly to a position 20a just short of panel portion 6a. The cylindrical bore 19a terminates in a rectangular bore 21a which extends through panel portion 6a adjacent one of the hinge elements 4. The cylindrical bore 19a, as viewed in FIG. 2, communicates with a radial slot which extends downwardly and to the left of cylindrical bore 19a. The slot comprises a first portion 22a which intersects chamber 9a, and a second portion 23a which does not intersect the chamber 9a. This is clearly shown in FIG. 3. Near its rearward end, the cylindrical bore 19a is intersected by a vertical U-shaped slot 24a. This slot 24a is intended to receive a closure member, closing the rearward end of cylindrical bore 19a. Such a closure member is illustrated in FIG. 7 at 25. The purpose of cylindrical bore 19a, rectangular bore 21a and slot 22a–23a will be apparent hereinafter. All of the remaining bores 19b through 19d are identical and like parts thereof are given like index numerals followed by "b"–"d". As indicated above, the last cylindrical chamber 9e does not have a cylindrical bore (such as cylindrical bores 19a–19d) in association therewith. Nevertheless, the last chamber 9e does have in association therewith a slot equivalent to slot 22a/23-a of cylindrical chamber 9a. This slot is indicated in FIGS. 2–4 at 22e/23e. The purpose for the slot 22e/23e will be apparent hereinafter.

Reference is now made to FIG. 7 which is a cross-sectional view taken along section line 7—7 of FIG. 2. It will be noted that section line 7—7 passes through cylindrical chamber 7a and cylindrical bore 19a. FIG. 7 illustrates a female receptacle generally indicated at 11, a female rotating ring generally indicated at 28, a locking pin generally indicated at 29 and a latch generally indicated at 30. Each of these elements will be described in their turn.

Figure 8:
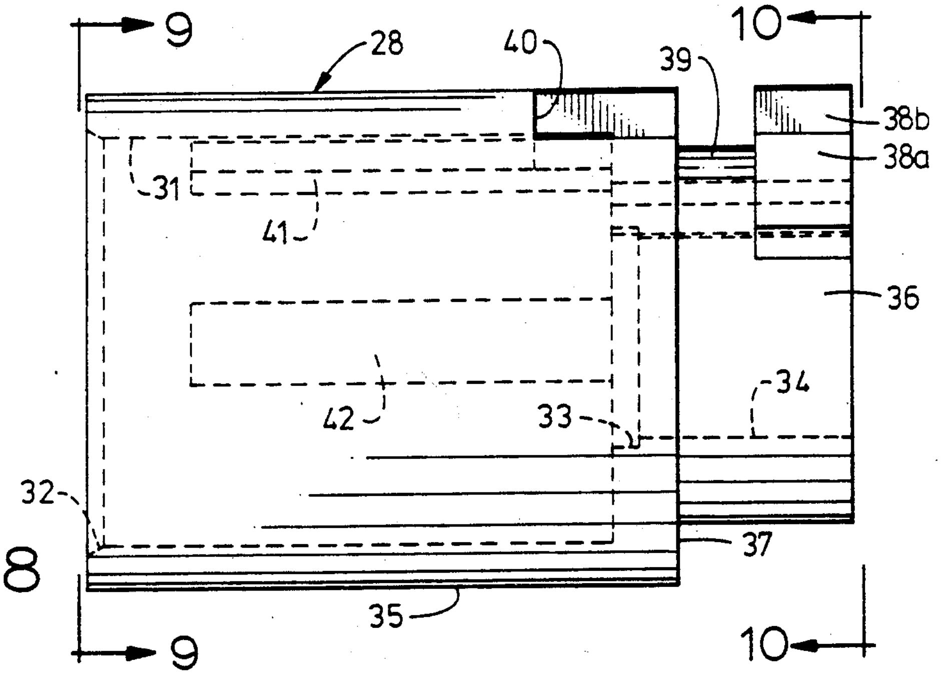
FIG. 8 is a side elevational view of the female rotating ring of FIG. 7.
Figure 9:
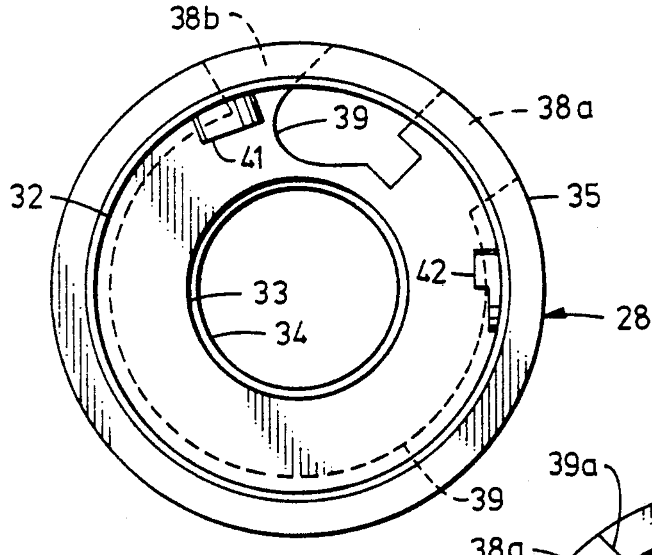
FIG. 9 is a front view of the female rotating ring of FIG. 8.
Figure 10:
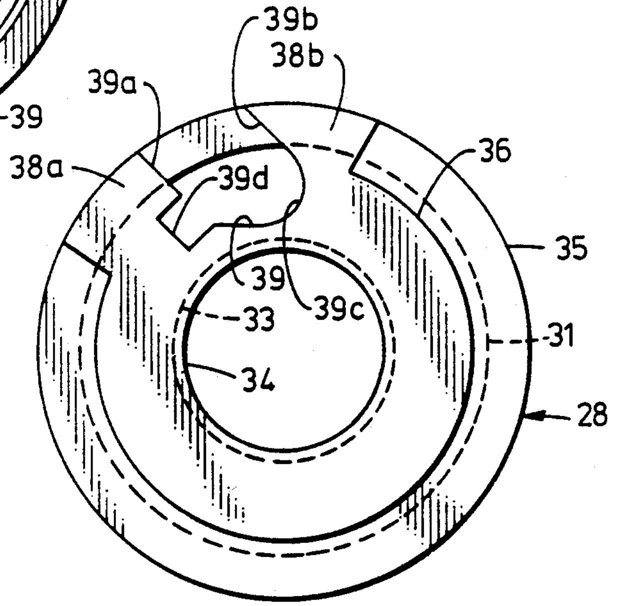
FIG. 10 is a rear view of the female rotating ring of FIG. 7.

Female rotating ring 28 is shown in detail in FIGS. 8, 9 and 10. The female rotating ring comprises a generally cylindrical member having an axial bore 31. At the forward end of the female rotating ring, the axial bore 31 is provided with an annular relief 32. Near the rearward end of the female rotating ring, the axial bore 31 terminates in an intermediate axial bore 33 of lesser diameter. The intermediate axial bore 33, in turn, terminates in a bore 34 of slightly smaller diameter. The axial bore 34 extends through the rearward end of the female rotating ring 28.

Exteriorly, female rotating ring has a cylindrical exterior surface 35 which surrounds all of axial bore 31, all of axial bore 33 and an initial portion of axial bore 34. That portion of the exterior surface of female rotating ring 28 which surrounds the remainder of axial bore 34 is of lesser diameter, as at 36. The difference in diameter between exterior portion 35 and exterior portion 36 forms an annular shoulder 37. Adjacent the rearward end of female rotating ring 28, the exterior surface portion 36 is provided with an upstanding lug. This upstanding lug is divided into two portions 38*a* and 38*b* by a slanted slot 39 which extends from the rearward end of female rotating ring 38, through the lug 38*a*-/38*b*, the shoulder 37, and intersecting chamber 31 up to the point indicated at 40 in FIG. 8. As is most clearly shown in FIG. 10, the slot 39 has parallel slanted sides 39*a* and 39*b*, an arcuate bottom 39*c* and a laterally extending portion 39*d*. Female rotating ring 28 is completed by the provision of a pair of longitudinal interior polarizing lugs 41 and 42. Female rotting ring 28 is an integral, one-piece element molded of insulative material such as thermoplastic resin.

It will be understood that each of the cylindrical chambers 9*a*-9*e* will be provided with a female receptacle identical to receptacle 11. Each of the cylindrical chambers 9*a*-9*e* will also be provided with polarizing rings identical to polarizing ring 28, with the exception that the polarizing lugs for each female rotating ring will be differently positioned, of different shape, or both. In this way, each of the connectors to be mated with each of the female receptacles can only be mated with its intended receptacle. In the embodiment thus far described, the electrical panel assembly 1 is illustrated as provided with five cylindrical chambers 9*a*-9*e*. The female receptacle in the first chamber 9*a* will be a ground receptacle. The female receptacle in chamber 9*b* will be a neutral receptacle and the female receptacle in cylindrical chambers 9*c*, 9*d* and 9*e* will be phase 1, phase 2 and phase 3 receptacles, respectively. It will be understood that in an instance where it does not make a difference which of the phase 1, phase 2 and phase 3 connectors is connected to each of female receptacles of cylindrical chambers 9*c*, 9*d* and 9*e*, then the rotating rings of the last three mentioned chambers can have identically shaped and placed polarizing lugs.

Returning to FIG. 7, it will be noted that the female receptacle 11 has a forward portion 11*a* containing a female cavity 11*b*. The forward portion 11*a* of the female receptacle is followed by a portion 11*c* of larger diameter and a third portion 11*d* of substantially the same diameter as the forward portion 11*a*. Female receptacle 11 is shown as terminating in a threaded stud 11*e*. The threaded stud 11*e* enables attachment of the female receptacle to a buss bar or the like.

In the assembly of the structure shown in FIG. 7, female receptacle 11 is inserted in the female rotating ring 28 with the female receptacle portion 11*d* received in the female rotating ring bore 34 and the female receptacle portion 11*c* received in the female rotating ring bore 33. Clearances are such that the female rotating ring is rotatable about the female receptacle portions 11*c* and 11*d*. Thereafter, a ring 43 of material such as thermoplastic resin is mounted on the female receptacle portion 11*d* and that portion of the female receptacle is inserted through non-circular opening 10*a* of housing portion 8*a*. The female receptacle portion 11*d* is provided with a pair of flats, one of which is shown at 11*f*. The flats cause that part of female receptacle portion 11*d* to have a cross-section conforming to the non-circular opening 10*a*, so that the female receptacle 11 is non-rotatable. The female receptacle is provided with a retaining ring 44, a metallic washer 45, a metallic lock washer 46 and a nut 47. In this way, the female receptacle 11 is non-rotatively mounted in the housing element 8*a* and the female rotating ring 28 is captively and rotatively mounted within cylindrical chamber 9*a*. It will be understood that all of the female rotating rings in each of the cylindrical chambers 9*a*-9*e* will be similarly mounted for rotation about their respective receptacles.

Figure 12:
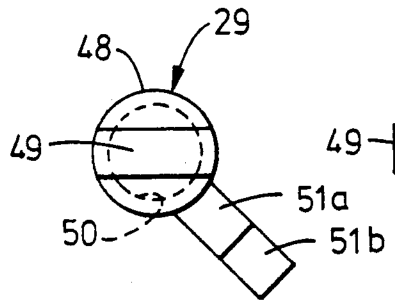
FIG. 12 is a front view of the locking pin of FIG. 11, as seen from the left of that Figure.
Figure 11:
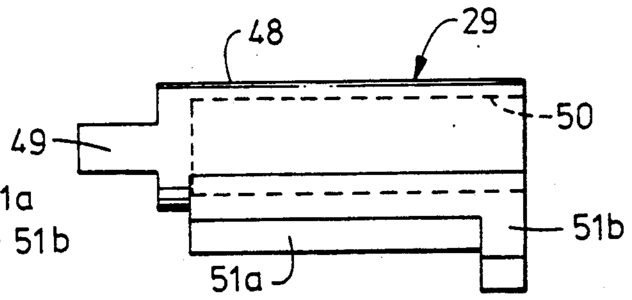
FIG. 11 is a side elevational view of the locking pin of FIG. 7.

The locking pin 29 is illustrated in FIGS. 11 and 12. The locking pin 29 comprises an integral, one-pice member, molded of appropriate insulative thermoplastic material. The locking pin constitutes a cylindrical body 48, terminating at its forward end in a diametrically positioned, substantially rectangular lug or nose 49. The rearward end of locking pin 29 is provided with an axial bore 50 which extends to a position just short of the forward end, as illustrated in FIG. 11. The peripheral surface of the cylindrical body 48 of locking pin 29 is provided with a longitudinally extending radial lug comprising a first portion 51*a* and a second portion 51*b* of greater radial length.

FIG. 7 illustrates the locking pin 29 mounted within housing element 8*a*. The cylindrical body portion 48 of the locking pin is slidably received within the housing element bore 19*a*. The locking pin lug 51*a*/51*b* is received within the housing element slot 22*a*/23*a* with the lug portion 51*a* located in slot portion 23*a* and the lug portion 51*b* located in slot portion 22*a*. A compression spring 52 is mounted within the locking pin bore 50. One end of the compression spring 52 abuts the closed end of bore 50, the other end of compression spring 52 abuts the closure 25, described above.

It will be apparent from FIG. 7 that the locking pin 29 is axially shiftable in the bore 19*a* and the slot 22*a*/23*a*. In FIG. 7, the locking pin 29 is illustrated in its forwardmost, normal position. In this position, the locking pin nose 49 extends through the panel portion opening 21*a* (see FIG. 2). The purpose of the locking pin will be apparent hereinafter.

Figure 14:
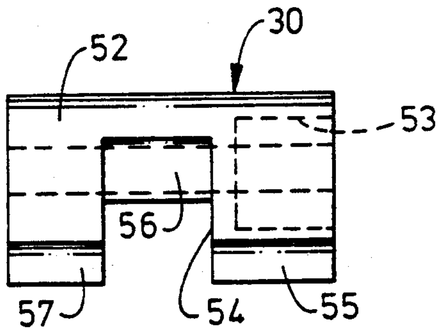
FIG. 14 is a rear view of the latch of FIG. 13, as seen from the left of that Figure.
Figure 13:
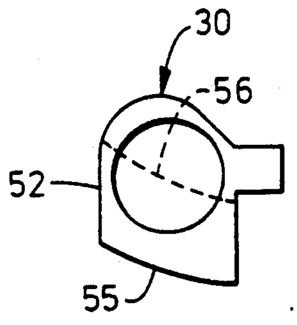
FIG. 13 is a side elevational view of the latch of FIG. 6.

The latch 30 of the present invention is illustrated in FIGS. 13 and 14, and comprises an integral, one-piece member molded of appropriate insulative thermoplastic. A comparison of FIGS. 10 and 14 makes it immediately evident that the latch 30 has a body 52 with the same cross-sectional peripheral configuration as the female rotating ring slot 39. The body 52 has a laterally extending lug 53 corresponding to the lateral portion 39*d* of slot 39. The latch 30 is slidabaly receivable in the female rotating ring slot 39. The rearward end of the latch 30 has a bore 53 formed therein. The latch body 52 has a notch 54 formed therein, which is of a width slightly greater than the lug portion 51*b* of locking pin 29.

The latch 30 is slidably mountable in the female rotating ring slot 39, as shown in FIG. 7. The latch 30 is therefore carried by the female rotating ring 28 and is axially shiftable in the slot 39 between a normal forward position wherein the forward end of latch 30 abuts the stop surface 40 of the female rotating ring, and a rearward position wherein the latch notch is aligned with the lug portion 51*b* of locking pin 29. In its rearward position, the rearward portion of the latch body 30 is aligned with the female rotating ring lug 38*a*/38*b*. The latch 30 has an arcuate peripheral portion 55 which matches and forms a continuation of the peripheral surface of the female rotating ring lug 38*a*/38*b* when the latch 30 is in its rearward most position. The latch notch 54 has an arcuate surface 56 which matches the peripheral surface of female rotating ring portion 36 Similarly, the forward end of latch 30 has an arcuate peripheral surface 57 which matches the peripheral surface of portion 35 of the female rotating ring.

The bore 53*a* of latch 30 is adapted to receive a compression spring 58. One end of the compression spring abuts the end of latch bore 53. The other end of compression spring 58 abuts the ring 43 mounted on the portion 11*d* of female receptacle 11. Compression spring 58 biases the latch 30 to its forwardmost position, as shown in FIG. 7. It will be noted that when the latch 30 is in its forwardmost position, a portion thereof is located within the cylindrical bore 31 of the female rotating ring 28. The purpose of latch 30 will be apparent hereinafter.

Figures 15, 16, 23, 24:
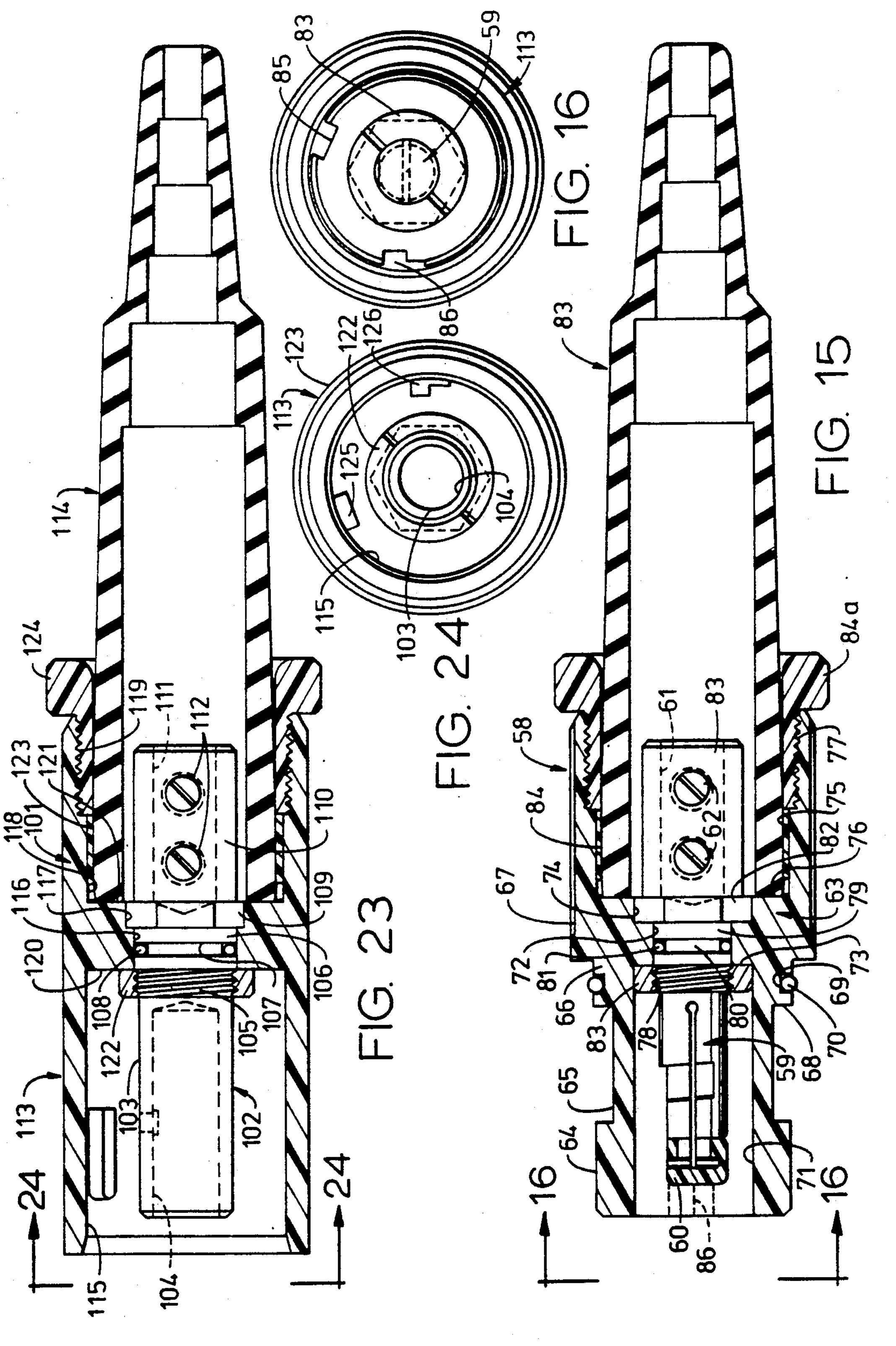
FIG. 15 is a longitudinal cross-sectional view of a male connector and its polarizing shell.
FIG. 16 is an end elevational view of the polarizing shell of FIG. 15.
FIG. 23 is a longitudinal cross-sectional view of a female connector together with its polarizing shell.
FIG. 24 is a front elevational view of the polarizing shell of FIG. 23.

FIG. 15 illustrates a cable connector generally indicated at 58 and having male contact (generally indicated at 59) for use with female receptacle 11. The male contact 59 is of the conventional type having an insulative member 60 affixed to its forwardmost end for purposes of safety and being lockable with respect to female receptacle 11 when inserted therein and rotated a partial turn. At its rearward end, the male contact is provided with a bore 61 to receive a cable end (not shown). The cable end is locked in bore 61 by a pair of set screws 62 or by crimping.

The male contact 59 is mounted in an insulative housing comprising a polarizing shell and a cable insulator. The polarizing shell (generally indicated at 63) is molded of appropriate insulative thermoplastic resin. Exteriorly, the insulative shell has a first cylindrical portion 64 followed by a second cylindrical portion 65 of lesser diameter. The portion 65, in turn, is followed by a cylindrical portion 66 of the same diameter as the portion 64. The portion 66 terminates in a portion 67 of larger diameter The outside diameter of portions 64 and 66 is substantially the same as the inside diameter of female rotating ring bore 31. The outside diameter of polarizing shell portion 67 approximates the outside diameter of female rotating ring portion 35. Between portions 66 and 67 of polarizing shell 63 a shoulder 68 is formed. The polarizing shell portion 66 has an annular notch 69 formed therein, carrying an O-ring 70.

Comparing FIGS. 15 and 7, when the male contact 59 is inserted in the female receptacle 11, the polarizing shell portions 64 and 66 are just nicely received within the bore 31 of the female rotating ring. The O-ring 70 makes a fluid-tight seal with the interior surface of female rotating ring bore 31. The shoulder 68 abuts the forward end of the female rotating ring 28.

Returning to FIG. 15, the polarizing shell 63 has an axial bore. The axial bore is made up of several portions. The forwardmost portion 71 surrounds the forward end of the male contact 59. The portion 71 is followed by a portion 72 of lesser diameter, forming a shoulder 73 therebetween. The portion 72, in turn, is followed by a portion 74 having a hexagonal peripheral configuration. A portion 75 of larger diameter follows the portion 74 and forms a shoulder 76 therebetween. Finally, the portion 75 is followed by a portion 77 which is internally threaded.

The forward portion of male contact 59 terminates in an exteriorly threaded part 78. This, in turn, is followed by an intermediate portion 79 of substantially the same diameter and having an annular notch 80, containing an O-ring 81. The intermediate portion 79 is followed by a rearward portion 82 having a hexagonal peripheral configuration. The final portion 83 is cylindrical and contains the bore or socket 61.

The male contact 59 is mounted in polarizing shell 63 by inserting it into the polarizing shell 63 from the rear thereof. When this is done, the rearward hexagonal portion 82 of the male contact is just nicely received in the hexagonal polarizing shell bore portion 74. The intermediate portion 79 of the male contact 59 is received within the polarizing shell bore portion 72 and the O-ring 81 makes a fluid-tight seal therewith. A threaded retaining ring 83 is threadedly engaged on the male contact portion 78 to lock the male contact 59 in the polarizing shell 63. The hexagonal portion 82 of male contact 59, being located in the hexagonal portion 74 of polarizing shell 63, precludes rotation of the male contact within the polarizing shell.

The male contact is provided with an elongated and tapered cable insulator (generally indicated at 83) The cable insulator is molded of suitable insulative material such as thermoplastic elastomer. Cable insulator 83, near its forward end, is surrounded by an annular ring 84. When in place, the forward end of cable insulator 83 abuts the polarizing shell shoulder 76 and the rim 84 is just nicely received within the polarizing shell bore portion 75. The cable insulator 83 is held in place by a nut 84*a* threadedly engaged in the bore portion 77 of the polarizing shell. The forward end of nut 84*a* abuts the cable insulator ring 84, maintaining the cable insulator in place.

The assembly of FIG. 15 is completed by the provision of polarizing slots 85 and 86 formed in the exterior portion 64 of the polarizing shell. This is illustrated in FIG. 16 which constitutes a forward end view of polarizing shell 63. It will be noted that polarizing slots 85 and 86 are so shaped and positioned as to cooperate with the polarizing lugs 41 and 42, respectively, of the female rotating ring. This assures that only contact 59 can be mated with receptacle 11.

Figure 17:
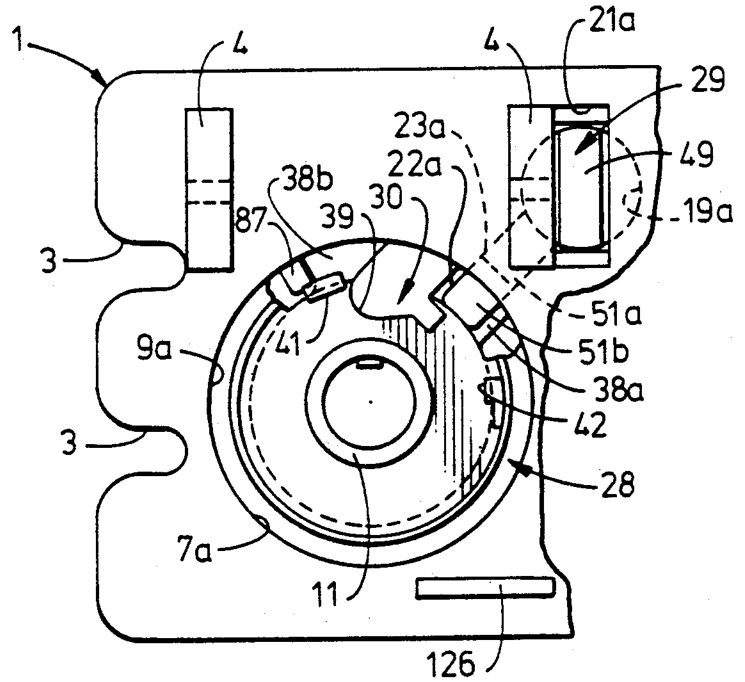
FIG. 17 is a fragmentary elevational view of the first opening of the panel assembly with the cover removed and the female rotating ring, the locking pin and the latch in their normal positions.
Figure 18:
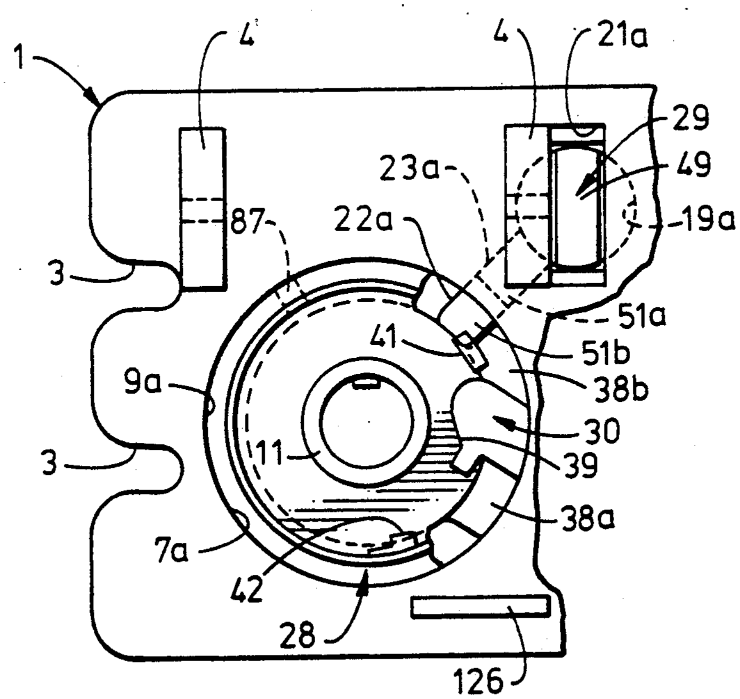
FIG. 18 is a fragmentary elevational view similar to FIG. 17, but illustrating the relative positions of the female rotating ring, the locking pin and the latch when a male connector (not shown) is connected with the female receptacle and locked with respect thereto.

The first embodiment of the present invention having been described in detail, the manner of its operation can now be set forth. Reference is made to FIGS. 7, 17 and 18.

In FIGS. 7 and 17, all of the associated parts are illustrated in their normal, unactuated positions. The normal position of female rotating ring 28 is determined by abutment of the female rotating ring lug portion 38*b* against a stop 87 located within cylindrical chamber 9*a*. Locking pin 29 is in its forwardmost position, wherein its nose 49 extends through panel opening 21*a* and contacts the rear surface 14*a* of cover 5*a*, locking cover 5*a* in its closed position. Latch 30, urged by compression spring 53*a*, is in its forwardmost position, wherein its forwardmost portion extends into the cylindrical bore 31 of female rotating ring 28. As is most clearly shown in FIG. 7, when the latch 30 is in its normal position, its notch 54 is not aligned with lug portion 51*b* of locking pin 29, with the result that clockwise rotation of the female rotating ring 28 is precluded. This is true because clockwise rotation of the rotating ring would cause the latch 30 to abut lug portion 51*b* of locking pin 29, stopping such rotation. As a result of this, any attempt to open the next adjacent cover 5*b* will be unsuccessful. This is true because the lug portion 51*b* of locking pin 29 is located directly in front of female rotating ring lug portion 38*a* (as shown in FIG. 17), precluding any rearward shift of locking pin 29.

If the cable connector of FIG. 15 is oriented so that its polarizing slots 85 and 86 are aligned with the polarizing lugs 41 and 42, respectively, of the female rotating ring 28, the cable connector can be inserted within the female rotating ring cylindrical bore 31, causing contact to be made between male contact 59 and female receptacle 11. It will be apparent, however, that when the forward end of the cable connector polarizing shell 63 is fully seated within the female rotating ring bore 31, the latch 30 will shift rearwardly against the action of its compression spring 53*a*. This will cause the latch notch 54 to align with the lug portion 51*b* of locking pin 29. As a result, the cable connector and the female rotating ring can be rotated a partial turn in a clockwise direction with the lug portion 51*b* of locking pin 29 passing through the slot 54 of latch 30. FIG. 18 illustrates the female rotating ring 28 in its actuated position wherein the female rotating ring lug portion 38*b* has gone beyond locking pin lug portion 51*b*. The position of the female rotating ring 28, illustrated in FIG. 18, is determined by the amount of rotation required to achieve locking of the male contact 59 within the female receptacle 11. Now that the female rotating ring lug portion 38*b* has turned beyond the portion 51*b* of the locking pin lug, the locking pin 28 is free to shift axially and rearwardly against the action of its compression spring 52. Thus, the next adjacent cover 5*b* can be shifted to its open position because its arcuate lug portion 14 will simply shift the locking pin 29 rearwardly and out of the way. At this point, a cable connector can be inserted and locked in the receptacle housed within chamber 9*b*. When this is accomplished, the cover 5*c* of panel opening 7*c* can be opened.

In this way, each of the covers 5*b* through 5*e* can be opened when the appropriate cable connector is mated and locked with respect to its receptacle located in the adjacent preceding cylindrical chamber. As a consequence, the cable connectors can be connected to the panel only in the order of from the first receptacle to the last receptacle (i.e., in the order of ground, neutral, phase 1, phase 2 and phase 3).

It will be understood from the above description that each of the covers 5*a*–5*d* will coöperate with their respective locking pins in the same manner to preclude the disconnecting of a cable connector from the panel in any order other than from the last to the first (i.e., in the order of phase 3, phase 2, phase 1, neutral and ground). Thus, if it were attempted to disconnect the cable connector associated with panel cylindrical chamber 9*d* before disconnecting the cable connector associated with panel cylindrical chamber 9*e*, it would be found that this could not be accomplished because with cover 5*e* open, the locking pin associated with panel cylindrical 9*d* would be misaligned with respect to its respective latch 30, precluding rotation in a counterclockwise direction of its respective female rotating ring 28 from its actuated position (as shown in FIG. 18) to its normal position (shown in FIG. 17.)

The embodiment of the present invention thus far described constitutes a panel having female receptacles. By convention, such a panel is considered to be an input panel. It is possible to provide the electrical panel assembly of the present invention with male receptacles to produce an output panel. To accomplish this, it is only necessary to change the receptacles, the rotating rings, the cable connectors and their polarizing shells. The molding 6 remains the same, as do the closures 5*a*–5*e*, the locking pins 29 and the latches 30. Therefore, in FIGS. 19–26, like parts have been given like index numerals.

Figure 19:
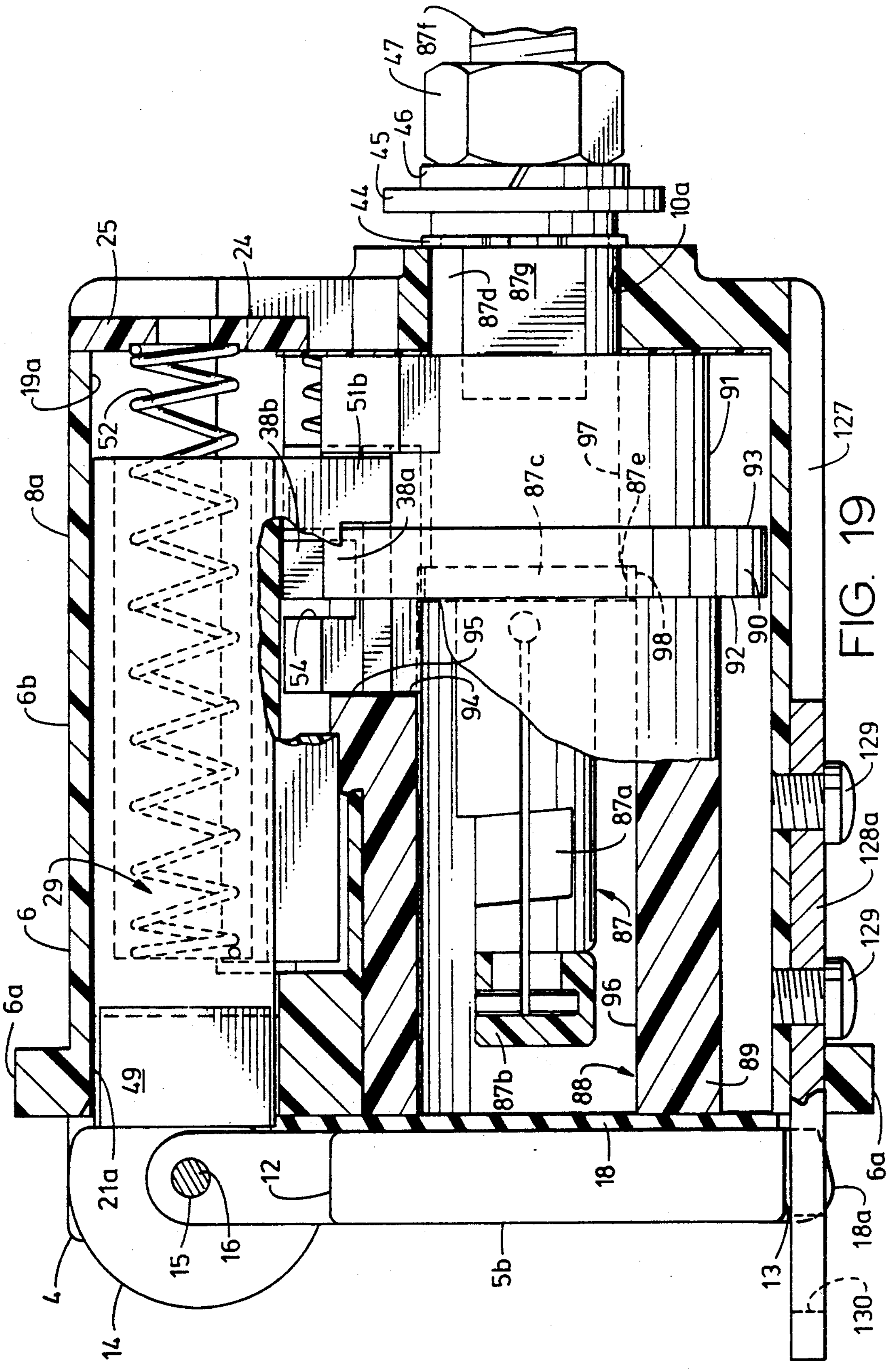
FIG. 19 is a cross-sectional view of the electrical panel assembly of the present invention illustrating a receptacle housing portion with all of its elements mounted therein, including a male receptacle.
Figure 20:
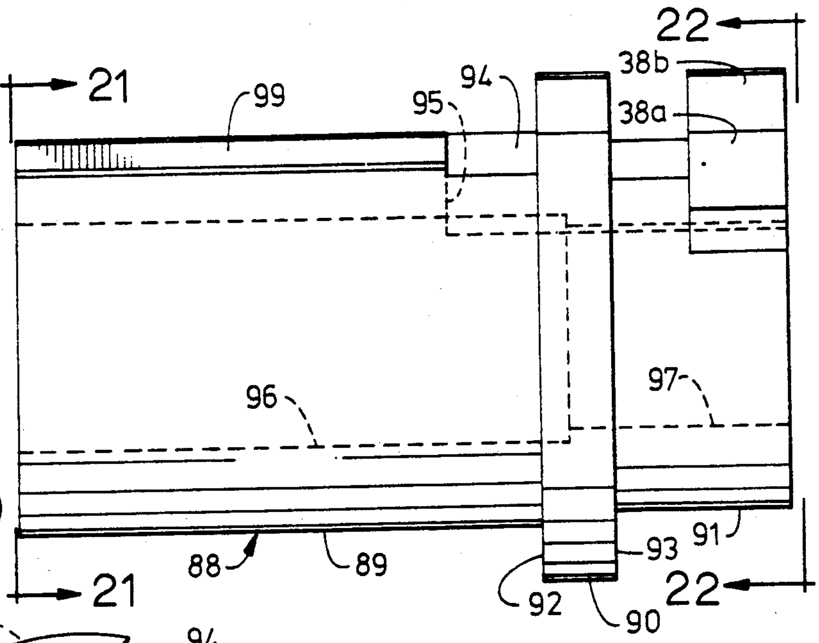
FIG. 20 is a side elevational view of the male rotating ring of FIG. 19.
Figure 21:
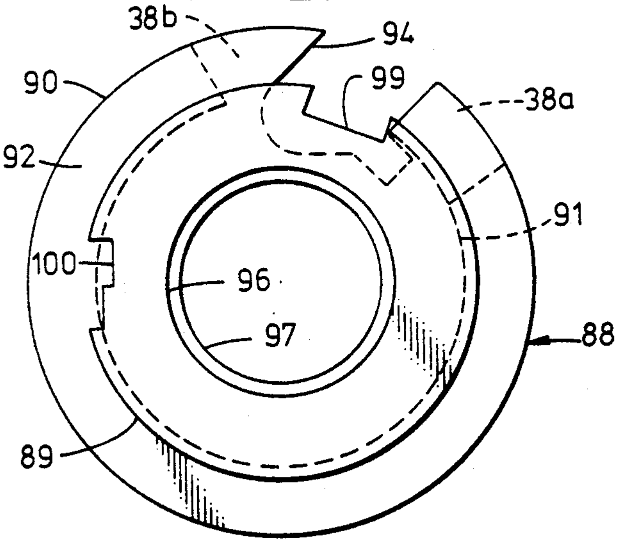
FIG. 21 is a front view of the male rotating ring of FIG. 20.
Figure 22:
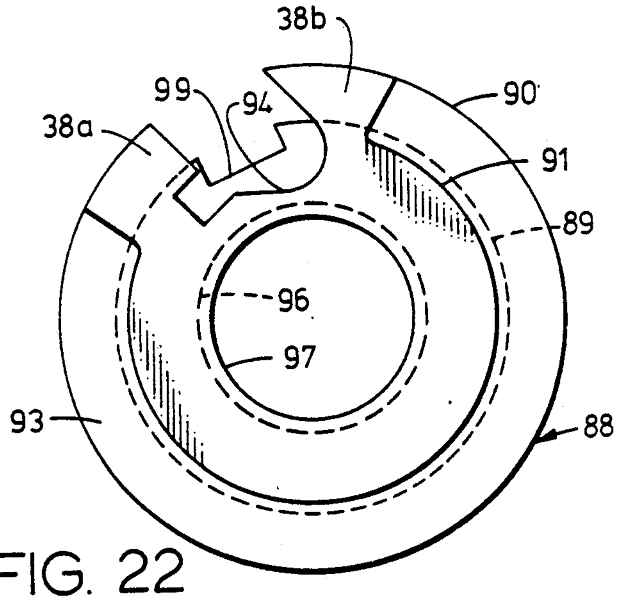
FIG. 22 is a rear view of the male rotating ring of FIG. 20.

Turning first to FIG. 19, the male receptacle is generally indicated at 87. The male receptacle is conventional having a forward end 87*a* terminating in an insulative safety element 87*b*. The forward portion 87*a* is of the type which locks with the female connector, when the female connector is mated therewith and rotated a partial turn with respect thereto.

At the rearward end of the forward portion 87*a* there is a cylindrical portion 87*c* of larger diameter. The portion 87*c* is followed by a cylindrical portion 87*d* having a diameter greater than the front portion 87*a* and less than the portion 87*c*, forming a shoulder 87*e* therebetween. Finally, the portion 87*d* terminates in a threaded stud 87*f*. The threaded stud 87*f* allows the receptacle 87 to be affixed to a buss bar (not shown) or the like.

Referring to FIGS. 19–22, the male rotating ring is generally indicated at 88. The male rotating ring is a substantially cylindrical member having an exterior configuration comprising a forward portion 89 followed by an intermediate portion 90 of greater diameter The portion 90 has an outside diameter such as to be just nicely and rotatively received in the panel's cylindrical chamber 9*a*. The portion 90 is followed by a portion 91 of lesser diameter. An annular shoulder 92 is formed between the portions 89 and 90, and an annular shoulder 93 is formed between the portions 90 and 91. A comparison of FIGS. 20 and 8 will show that the portion 90 of the male rotative ring 88 has the same outside diameter as the portion 35 of the female rotating ring 28. Similarly, the portion 91 of the male rotating ring has an outside diameter equivalent to the outside diameter of portion 36 of female rotating ring 28.

The portion 91 carries at the rearward end of the male rotating ring 88 a lug identical to the lug 38*a*/38*b* of the female rotating ring 28 and given the same index numerals. The lug 38*a*/38*b* is divided by a longitudinal slot 94 extending from the rearward end of the male rotating ring 88 through the lug 38*a*/38*b*, the portion 91, the portion 90 and partway into the portion 89, ending, as indicated, at 95. The slot 94 is substantially identical to slot 39 of the female rotating ring 28, and has the same cross-sectional configuration.

The male rotating ring 88 has an axial bore comprising a forward portion 96 and a rearward portion 97 of lesser diameter, forming a shoulder 98 therebetween.

The male rotating ring 88 is completed by the provision of a pair of exterior longitudinal polarizing slots 99 and 100. The longitudinal polarizing slots extend from the front of the male rotating ring to the shoulder 92.

Returning to FIG. 19, the male receptacle 87 is inserted in the male rotating ring from the front thereof. The portion 87*d* of the male receptacle passes through the perforation 97 in the male rotating ring 88 with the annular male contact shoulder 87*e* abutting the male rotating ring shoulder 98. The portion 87*d* of the male receptacle also passes through the non-circular opening 10*a* in housing element 8*a*. To accomplish this, the portion 87*d* of the male receptacle 87 is provided with a pair of diametrically opposed flats, one of which is indicated at 87*g*. These flats cooperate with the non-circular opening 10*a* to assure that the male receptacle is non-rotatively mounted. The portions 87*c* and 87*d* of the male receptacle 87 are of such diameter with respect to the male rotating ring bores 96 and 97 that the male rotating ring is rotatable with respect to the male receptacle 87. The male receptacle 87 is locked in place by retaining ring 44. Washer 45, lock washer 46 and nut 47 are used to attach stud 87*f* to a buss bar.

In FIG. 23 a female cable connector is generally indicated at 101. The female connector 101 comprises a female contact generally indicated at 102. Contact 102 is substantially conventional and is of the type which locks with a male receptacle when fully seated thereon and rotated with respect thereto a partial turn. The female contact 102 comprises a first or forward cylindrical portion 103 containing a female socket 104 for the male receptacle. The portion 103 terminates in a threaded portion 105 which, in turn, terminates in a cylindrical portion 106. The portion 106 is provided with an annular groove 107, containing an O-ring 108. The portion 106 is followed by a portion 109 having a hexagonal peripheral configuration. The portion 109 terminates in a cylindrical portion 110 having a socket 111 formed therein. The socket 111 is intended to receive a cable end (not shown) which is locked therein by set screws 112, or by crimping.

As is the usual practice, the female contact is provided with an insulative housing. The insulative housing is made up of two parts generally indicated at 113 and 114. The portion 113 comprises a cylindrical element serving not only as a part of the insulative housing, but also as a polarizing shell. The polarizing shell 113 has a constant external diameter of such size as to be slidably received in the cylindrical chamber 9*a* of molding 6.

The polarizing shell 113 has an axial bore made up of a plurality of bore portions. The forward bore portion 115 is of an interior diameter sized to receive the forward portion 89 of the male rotating ring with a sliding fit. Bore portion 115 is followed by bore portion 116 of a diameter to just nicely receive female contact portion 106. Bore portion 116 is followed by bore portion 117 having a hexagonal peripheral shape, sized to just nicely receive the portion 109 of female contact 104. Hexagonal bore portion 117 is followed by cylindrical bore portion 118 of larger diameter. Finally, bore portion 118 is followed by bore portion 119 of yet larger diameter and internally threaded. A shoulder 120 is formed between bore portions 115 and 116. Similarly, shoulder 121 is formed between bore portions 117 and 118.

The female contact 102 is mounted in the polarizing shell 113 by inserting it therein from the rear thereof. The forward portion 103 of contact 102 is located within polarizing shell bore portion 115. The contact portions 106 and 109 are located respectively in the polarizing shell bore portions 116 and 117, while the contact portion 110 is located within the polarizing shell bore portions 118 and 119.

The receipt of the hexagonal female contact portion 109 in hexagonal bore portion 117 assures that the female contact is non-rotatively mounted within polarizing shell 113. The female contact is locked in place by a threaded ring 122 engaged on the threaded contact portion 105 and abutting polarizing shell shoulder 120.

The cable insulator 114 comprises a hollow, elongated member, the forward end of which abuts the polarizing shell shoulder 121. Near its forward end, the cable insulator 114 has a ring-like element 123 affixed to the exterior thereof. A nut 124 is threadedly engaged in the polarizing shell bore portion 119 and abuts the ring 123, firmly affixing the cable insulator 114 in place within polarizing shell 113.

The cable connector 101 is completed by the provision of a pair of longitudinally extending polarizing lugs 125 and 126 located on the interior surface of the polarizing shell bore portion 115. The polarizing lugs 125 and 126 are adapted to cooperate with the male rotating ring polarizing slots 99 and 100, respectively.

Figure 25:
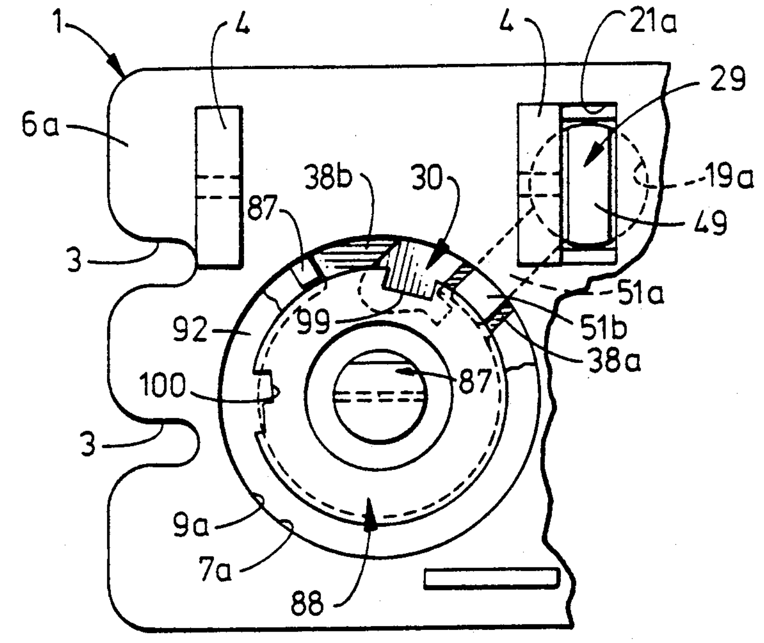
FIG. 25 is a fragmentary elevational view of the electrical panel assembly illustrating the first opening therein together with a male rotating ring, the locking pin and the latch in their normal positions.
Figure 26:
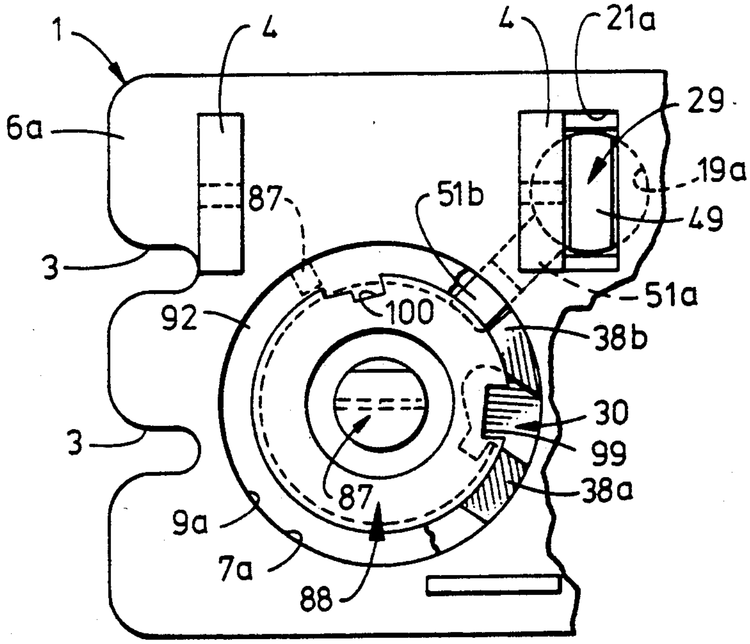
FIG. 26 is a fragmentary elevational view, similar to FIG. 25, but illustrating the male rotating ring, the locking pin and the latch in their relative positions when a female connector (not shown) is mated with the male receptacle and locked with respect thereto.

The second embodiment of the present invention having been described in detail, the manner of its operation can now be set forth. Reference is made to FIGS. 19, 25 and 26. In FIGS. 19 and 25, all of the associated parts are illustrated in their normal, unactuated positions. The normal position of the male rotating ring 88 is determined by abutment of the male rotating ring lug portion 38*b* against a stop 87 located within cylindrical chamber 9*a*. Locking pin 29 is in its forwardmost position, wherein its nose 49 extends through panel opening 21*a* and contacts the rear surface 14*a* of cover 5*b*, locking cover 5*b* in its closed position. The latch 30, urged by compression spring 58, is in its forwardmost position wherein its forwardmost portion extends forwardly of male rotating ring shoulder 92. As is apparent from FIG. 19, when the latch 30 is in its normal position, its notch 54 is not aligned with lug portion 51*b* of locking pin 29, with the result that clockwise rotation of the male rotating ring 88 is precluded. This is true because clockwise rotation of the male rotating ring would cause the latch 30 to abut lug portion 51*b* of locking pin 29, stopping such rotation. This is apparent from FIG. 25. As a result, any attempt to open the next adjacent cover 5*b* will not be successful because the lug portion 51*b* of locking pin 29 is located directly in front of female rotating lug portion 38*a* (as shown in FIG. 25), precluding any rearward shifting of the locking pin 29.

If the cable connector 101 of FIG. 23 is oriented so that its polarizing lugs 125 and 126 are aligned with polarizing slots 99 and 100, respectively, of the male rotating ring 88, the cable connector 101 can be inserted within panel opening 7*a* into cylindrical chamber 9*a* about the male rotating ring 88, causing contact to be made between female contact 103 and male receptacle 87. It will be apparent that when the forward end of cable connector polarizing shell 113 is fully seated, it will abut the shoulder 92 of the male rotating ring 88, shifting latch 30 rearwardly against the action of its compression spring 58. This will cause the latch notch 54 to align with the lug portion 51*b* of locking pin 29. As a result, the cable connector 101 and the male rotating ring 88 can be rotated a partial turn in a clockwise direction with the lug portion 51*b* of locking pin 29 passing through the slot 54 of latch 30. FIG. 26 illustrates the male rotating ring 88 in its actuated position wherein the male rotating ring lug portion 38*b* has gone beyond the locking pin lug portion 51*b*. The position of the male rotating ring 88, illustrated in FIG. 26, is determined by the amount of rotation required to achieve locking of female contact 102 with respect to male receptacle 87. Since the male rotating ring lug portion 38*b* has turned beyond the portion 51*b* of the locking pin lug, the locking pin 29 is free to shift axially and rearwardly against the action of its compression spring 52. Thus, the next adjacent cover 5*b* can be shifted to its open position because its arcuate lug portion 14 will simply shift the locking pin 29 rearwardly and out of the way. At this point, a cable connector can be inserted and locked in the receptacle housed within chamber 9*b*. When this is accomplished, the cover 5*c* of panel opening 7*c* can be opened. As in the case of the first embodiment, in this manner each of the covers 5*b*–5*e* can be opened when the appropriate cable connector is mated and locked with respect to its receptacle located in the adjacent preceding cylindrical chamber. As a consequence, the cable connectors can be connected to the panel only in the order of from the first receptacle to the last receptacle (i.e., in the order of ground, neutral, phase 1, phase 2 and phase 3).

It will be apparent that each of the covers *5a–5d* will cooperate with their respective locking pins in the same manner to preclude disconnecting of a cable connector from the panel in any order other than from the last to the first (i.e., in the order of phase 3, phase 2, phase 1, neutral and ground). Thus, if it were attempted to disconnect the cable connector associated with cylindrical chamber **9*d* before disconnecting the cable connector associated with panel cylindrical chamber 9*e*, it would be found that this could not be accomplished because with cover 5*e* open, the locking pin associated with panel cylindrical chamber 9*d* would be misaligned with respect to its respective latch 29, precluding rotation in a counterclockwise direction of its respective male rotating ring from its actuated position, a shown in FIG. 26, to its normal position as shown in FIG. 25**.

Reference is made to FIGS. 2, 3 and 4. It will be noted that there is no latch pin carrying bore 19 in association with the last cover **5*e*. This is true because there is no additional cover for a latch pin 29 to lock. Nevertheless, the molding 6 has a slot 22*e*/23*e* in association with cylindrical chamber 9*e*. In the slot 22*e*/23*e* there is located member 125 shaped exactly like a latch pin lug 51*a*–51*b*. The element 125 is fully forward in the slot 22*e*/23*e* and is permanently fixed in that position by gluing or the like. The provision of element 125 permits the latch 30 of the male or female rotating ring within cylindrical chamber 9*e* to function in its normal manner as described heretofore with respect to FIGS. 17, 18, 25 and 26. The presence of element 125 ensures that the male or female rotating ring in chamber 9*e* cannot be shifted between its normal and actuated positions manually. Further, a connector without the proper polarizing shell cannot be used in cylindrical chamber 9*e***.

As indicated above, the embodiments described are shown as having five cylindrical chambers **9*a*–9*e* and five covers 5*a*–5*e*. It will be understood that the panel 1 could also be made with three, four or six cylindrical chambers, each provided with a cover. A three chamber panel will have three receptacles: ground, neutral and phase 1. A four chamber panel will have four receptacles: ground, neutral, phase 1 and phase 2. A six chamber panel will have six receptacles: ground, neutral, neutral, phase 1, phase 2 and phase 3**.

Under some circumstances, where two or three current carrying connectors are used, it doesn't make any difference which current-carrying cable is connected to any particular one of the current-carrying receptacles. Under these circumstances, where there are two current-carrying cable connectors and two current-carrying receptacles, their respective polarizing shells and rotating rings may be given identical polarizing lugs and slots. The same is true for three current-carrying cable connectors and three current carrying receptacles where polarizing is not important. Nevertheless, it will be apparent that ground will still make first and break last.

Figure 27:
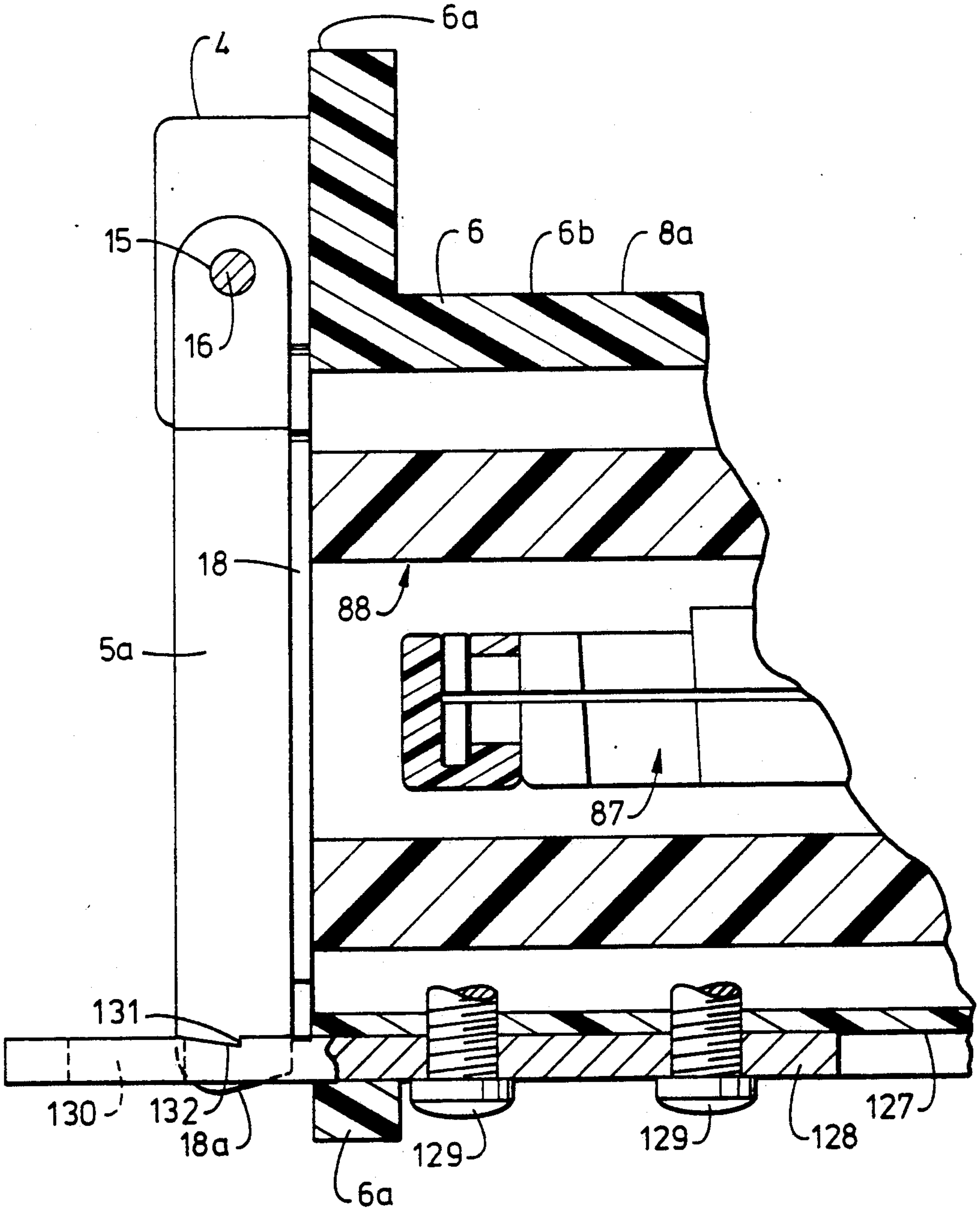
FIG. 27 is a fragmentary side elevational view, partly in cross section, illustrating the first cover in closed position.

Returning to FIG. 1, since each of the covers **5*b*–5*e* cannot be raised until the correct preceding cable connector is locked in position, by providing means to lock cover 5*a* in closed position, all of the covers will be locked in closed position. Such means are shown in FIGS. 1 and 27. It will be noted from FIG. 1 that just below the notch 13 in cover 5*a* there is a narrow rectangular opening 126 formed in panel portion 6*a*. The opening 126 leads to a groove 127, of the same width as the opening 126, and extending from the opening 126 to the rearward end of molding 6. A planar metallic locking bracket 128 is located in groove 127 and extends through opening 126 and forwardly of cover 5*a*. The locking bracket 128 may be fixed in groove 127 by any appropriate means including self-tapping screws 129 extending through locking bracket 128 and into molding 6**.

The forward most end of locking bracket 128 is provided with a perforation 130. The shackle of a padlock (not shown), or a lockable bicycle-type cable (not shown) may be caused to pass through perforation 130 precluding the opening of cover **5*a***.

It will be remembered that cover **5*a* is the first cover and there is no locking pin 29 maintaining it in closed position. Thus cover 5*a* can be opened at any time. It is therefore preferred to provide notch 13 on cover 5*a* with a tooth 131 which will cooperate with a corresponding depression 132 on locking bracket 128 to provide a snap fit between the tooth 131 and depression 132 to releasably maintain cover 5*a*** in closed position.

As is apparent from FIG. 2, each of the covers may be provided with a rearwardly extending slot equivalent to slot 127. At its forward end, the slot 127 terminates in an opening **126*a* similar to the opening 126. The openings 126*a*, however, do not extend completely through panel portion 6*a*, and are closed at the front surface of panel portion 6*a* by a thin web. However, this web can be readily removed and any one of the covers can be provided with a locking bracket 128*a* in the same manner as illustrated in FIG. 27. To this end, FIGS. 7 and 19 illustrate cover 5*b* provided with a locking bracket 128*a*. Locking bracket 128*a* differs from locking bracket 128 of FIG. 27 only in that no depression 132 is necessary since each of covers 5*b*–5*e* is provided with a locking pin 27**.

If the electrical panel assembly 1 of FIG. 1 is to be used with a three-cable system, covers **5*d* and 5*e* can be padlocked. Similarly, if the electrical panel assembly 1 is to be used with a four-cable system, cover 5*e*** can be padlocked.

In the exemplary embodiment, when each of the ground, neutral, phase 1, phase 2 and phase 3 connectors has been inserted into the panel system and locked with its respective receptacle, unauthorized removal of any of the cables can be precluded by simply locking the last connector in its connected position. To this end a bicycle-type cable padlock can be wrapped around the last connector and passed through the locking bracket perforation 130, thereby locking the last connector in place in the panel assembly.

Modifications can be made in the invention without departing from the spirit of it.

What is claimed is:

1. An electrical panel assembly for use with cable connectors, said electrical panel assembly comprising a front panel element and at least three receptacles, a housing element for each receptacle to mount said receptacles behind said front panel element arranged in a side-by-side row, said front panel element and said housing elements comprising an integral, one-piece molding, said front panel element having an opening therethrough for each receptacle and coaxial therewith through which a cable connector can extend for mating with said receptacle, a cover for each of said front panel element openings mounted on a hinge pin supported by a plurality of hinge elements comprising integral, one-piece parts of said molding, the receptacle at one end of said row, its front panel element opening and cover comprising the first receptacle, first front panel element opening and first cover, respectively, the-receptacle at the other end of said row, its front panel element opening, and its cover comprising the last receptacle, last front panel element opening and last cover, respectively, each of said covers being swingable between a closed position and an open position, each of said covers, except said first cover, having a locking lug, each receptacle housing element having a cylindrical chamber coaxial with its respective front panel element opening, each receptacle being non-rotatively mounted on the rear surface of its respective receptacle housing element with its forward end extending into and coaxial with said receptacle housing element cylindrical chamber, locking means being provided in association with each receptacle housing element except said receptacle housing element for said last receptacle, each said locking means comprising a locking pin slidably mounted in a bore formed in each receptacle housing except said receptacle housing for said last receptacle, each locking pin bore terminating in an opening in said front panel element located behind said locking lug of said cover for the next adjacent front panel element opening, each of said locking pins having a forward nose portion, compression spring means in said locking pin bores to urge said locking pins forwardly to their normal locking positions wherein each of said nose portions of said locking pins extends through its respective opening in said front panel element and abuts said lug of said cover covering the front panel opening for the next adjacent receptacle in a direction away from said first receptacle, each locking pin being shiftable to an unlocking position, releasing its respective cover locking lug, each locking pin having a radially extending lug located in a slot which intersects its respective cylindrical chamber, each locking pin lug having a portion extending into its respective cylindrical chamber, a cable connector for each of said receptacles, each of said cable connectors and its respective receptacle having a contact, each of said cable connectors being insertable into its respective receptacle and rotatable a partial clockwise turn to lock the contacts thereof together, each of said connectors having an insulative housing comprising a polarizing shell about its respective contact and a cable insulator, each polarizing shell having a forward portion with polarizing elements thereon, polarizing means, with polarizing elements thereon in association with each receptacle, said polarizing shells and said receptacle polarizing means being so configured that each polarizing shell will cooperate only with a receptacle polarizing means having corresponding polarizing elements thereon, so that each connector can be mated only with a predetermined receptacle, each said polarizing means in association with said receptacle comprising a ring rotatively mounted on the forward end of its respective receptacle within said cylindrical chamber of its respective receptacle housing element, said ring being coaxial with its respective cylindrical chamber, said ring being configured to be engaged by the forward portion of said polarizing shell of its respective connector only, said ring having an arcuate lug extending radially from its peripheral surface and part way thereabout at the rearward end of said ring, a latch means comprising a member for each ring slidably received in a peripheral slot in its respective ring, said slot in each ring extending part way across said ring in a direction parallel to the axis of said ring, said latch means being shiftable in said slot in directions parallel to the axis of said ring between a forward latching position and a rearward unlatching position, spring means biasing said latch to its latching position, said ring being rotatable between a maximum counterclockwise position determined by a stop formed in its respective cylindrical chamber, and a maximum clockwise position determined by said locking of said contacts of said connector and receptacle, when said locking pin is in its locking position, said latch is in its latching position and said ring is in its maximum counterclockwise position, said lug portion of said locking pin lies in front of said lug of said ring precluding shifting of said locking pin to its unlocking position and precluding rotation of said ring from said maximum counterclockwise position to said maximum clockwise position by abutment of said locking pin lug portion against said latch, said latch means having a notch formed therein, said latch means being shiftable to its unlatching position by said forward portion of the polarizing shell when its respective receptacle is mated with its respective connector, aligning said latch notch with said locking pin lug portion, whereby, when the cover of said first receptacle is opened and the proper cable connector is mated with said first receptacle, and said polarizing shell of said last mentioned cable connector is engaged with said ring of said first receptacle, said latch means is shifted to said unlatching position in alignment with said locking pin lug portion permitting said cable connector, its polarizing shell and said ring to be rotated clockwise to lock said connector and receptacle contacts and to remove said ring arcuate lug from behind the locking pin lug portion and causing it to pass through the latch means notch enabling opening of the cover of the next adjacent receptacle for mating with its respective connector, the mating of each receptacle with its respective connector thus unlocking the cover of the next succeeding receptacle until the last receptacle is mated with its respective connector, thereby assuring that the receptacles must be mated with their respective connectors in order from said first receptacle to said last receptacle, and whereby when the connector is disconnected from said last receptacle and the cover therefor is closed, the locking pin of the preceding receptacle housing is shifted to its normal locking position locking the cover of said last receptacle and permitting counterclockwise rotation of the connector of the preceding receptacle and disconnection therefrom such that the disconnection of each cable connector from its respective receptacle will permit disconnection of the preceding connector from its receptacle until the cable connector is disconnected from the first receptacle, thereby assuring that the cable connectors must be disconnected from their respective receptacles in the order of from last receptacle to first receptacle.

2. The panel assembly claimed in claim 1 wherein said panel assembly comprises an input panel assembly, said receptacles each comprising a single conductor female receptacle, and said cable connectors comprising single conductor male cable connectors.

3. The panel assembly claimed in claim 1 wherein said panel assembly comprises an output panel assembly, said receptacles each comprising a single conductor male receptacle, and said cable connectors comprising single conductor female connectors.

4. The panel assembly claimed in claim 1 including three receptacles and a front panel element opening for each receptacle, said receptacles in order from first receptacle to said last receptacle comprising a ground receptacle, a neutral receptacle and a current carrying receptacle.

5. The panel assembly claimed in claim 1 including four receptacles and a front panel element opening for each receptacle, said receptacles in order from said first receptacle to said last receptacle comprising a ground receptacle, a neutral receptacle, a first current carrying receptacle and a second current carrying receptacle.

6. The panel assembly claimed in claim 1 including five receptacles and a front panel element opening for each receptacle, said receptacles in order from said first receptacle to said last receptacle comprising a ground receptacle, a neutral receptacle, a first current carrying receptacle, a second current carrying receptacle and a third current carrying receptacle.

7. The panel assembly claimed in claim 1 including six receptacles and a front panel element opening for each receptacle, said receptacles in order from said first receptacle to said last receptacle comprising a ground receptacle, a neutral receptacle, a second neutral receptacle, a first current carrying receptacle, a second current carrying receptacle, and a third current carrying receptacle.

8. The panel assembly claimed in claim 1 including at least one locking bracket extending just beneath and forwardly of said first cover when in closed position, said at least one locking bracket having a perforation therein to receive a shackle of a padlock, whereby all of said covers can be locked in closed position by means of said padlock.

* * * * *